June 10, 1958

A. G. SNYDER 2,838,235

KEY-RESPONSIVE CALCULATING MACHINE WITH
AUTOMATIC REPEAT MECHANISM

Filed July 29, 1954

INVENTOR
ALTON G. SNYDER
BY
HIS ATTORNEYS

June 10, 1958

A. G. SNYDER 2,838,235

KEY-RESPONSIVE CALCULATING MACHINE WITH
AUTOMATIC REPEAT MECHANISM

Filed July 29, 1954

INVENTOR
ALTON G. SNYDER

BY

HIS ATTORNEYS

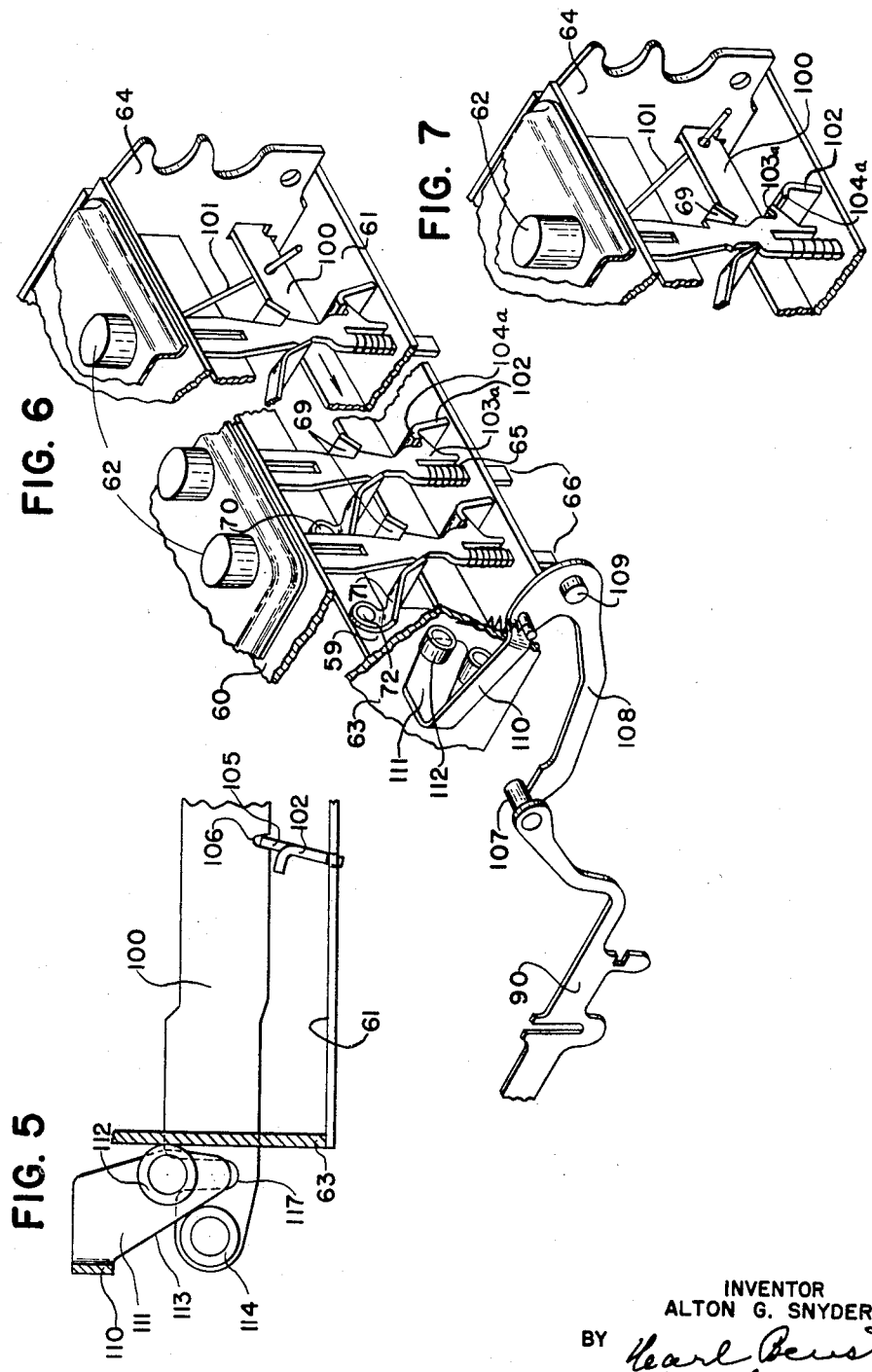

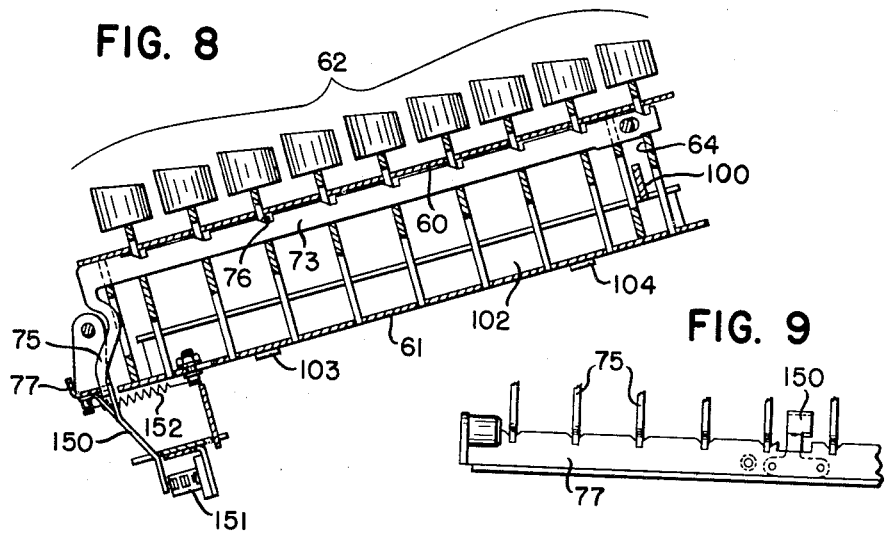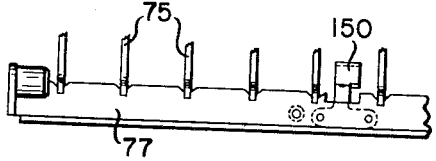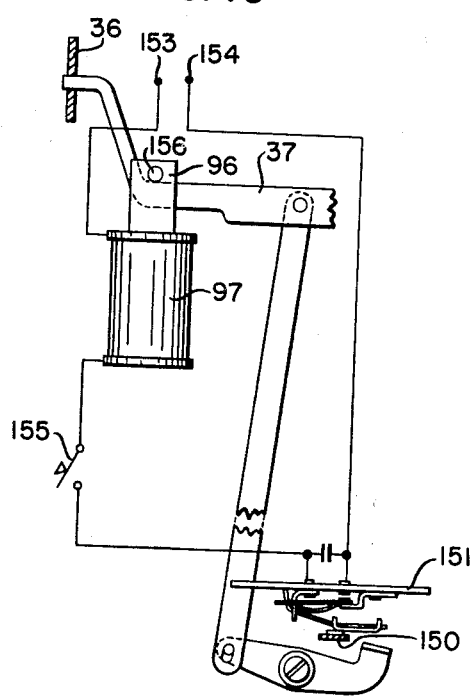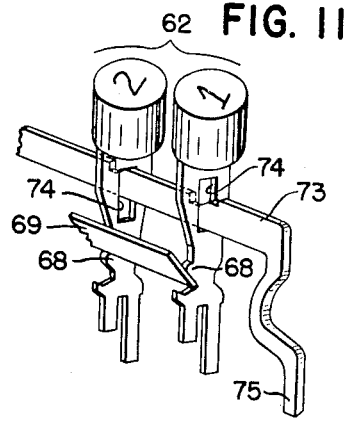
INVENTOR
ALTON G. SNYDER
BY
HIS ATTORNEYS

INVENTOR
ALTON G. SNYDER

United States Patent Office 2,838,235
Patented June 10, 1958

2,838,235

KEY-RESPONSIVE CALCULATING MACHINE WITH AUTOMATIC REPEAT MECHANISM

Alton G. Snyder, Ithaca, N. Y., assignor to The National Cash Register Company, Dayton, Ohio, a corporation of Maryland Application July 29, 1954, Serial No. 446,468

1 Claim. (Cl. 235—62)

This invention relates to improved repeat control mechanism for calculating machines and more particularly pertains to such mechanism which is operable from ordinary add and subtract motorized control keys and also from motorized, or "live," digit keys.

The novel mechanism is shown embodied in an electric-motor-driven machine of the type disclosed in the application of Roland G. Fowler et al. for United States Letters Patent, Serial No. 237,758, filed on July 20, 1951 now United States Patent No. 2,745,601. In that application there is disclosed a machine having a full keyboard and having each of the digit keys thereof operable to a data control stage and operable to a further stage by use of additional pressure, which causes the initiation of a machine cycle in which amounts, set up on the digit keys set to the control stage, and the amount set up by the digit key pressed to the further stage, are entered into the machine during the ensuing machine cycle initiated by said further movement of the key selected to initiate such cycle.

Applicant's mechanism is concerned with the means for locking the keys in unoperated or operated condition, as the case may be, during repeated machine cycles, such mechanism being known in the art as the key locking mechanism.

In general, the mechanism of this construction consists of mechanically coupling the machine-cycle-initiating trip means with the key lock mechanism so that, whenever the trip means is held in tripped condition, the key lock means will be held in locking position. Through the use of the add motor bar, the subtract motor bar, or the digit keys, any one of which will operate the trip mechanism, the key lock mechanism will be moved to locking position, and, by holding down any of said motor bars or digit keys, the key lock mechanism will be maintained in locking position, so that digit keys operated to control position or beyond cannot restore. Thus, by holding the selected motor bar or digit key in operated position, the machine is kept cycling and the operated digit keys are held in operated position, entering the amount represented by them into the machine totalizer, or totalizers, on each machine operation.

Therefore, it is an object of this invention to provide a novel repeat mechanism which functions by merely holding in operated condition an add or subtract control motor bar or a digit key which is "live," or motorized.

It is a further object of this invention to cause the operation of any machine-cycle-initiating key to lock the digit keys in operated or unoperated condition, as the case may be.

With these and incidental objects in view, the invention includes certain novel features of construction and combinations of parts, a preferred form or embodiment of which is hereinafter described with reference to the drawings which accompany and form a part of this specification.

Of the drawings:

Fig. 5 is a detail view of the digit key lock slide and a portion of the lever which operates it, as viewed from the rear of the machine.

Fig. 6 is a perspective view, partly broken away, as looked at from the rear right of the keyboard, of the key locking slide mechanism and its mechanical coupling to the machine-cycle-initiating trip lever.

Fig. 7 is a detail view showing one of the digit keys locked in unoperated condition, whereas Fig. 6 shows the digit keys locked in operated condition.

Fig. 8 is a section through a typical digit key denominational order, showing the "live" key switch mechanism and the key latching shutter associated with that bank, the keys in this view being shown in unoperated condition.

Fig. 9 is a top plan view of the left end of the bail at the front of the machine, which is rocked by the operation of any of the digit keys to the position where it initiates a machine cycle.

Fig. 10 is a top plan view, in partial diagrammatic form, of the solenoid operating switch, the solenoid, and the trip linkage, whereby the machine cycles are initiated by use of the digit keys or the motor bars.

Fig. 11 is a perspective view of two keys of a denominational order, one unoperated and the other operated, and a portion of the latching shutter which holds the keys in control position.

*Main drive mechanism*

Figure 1:
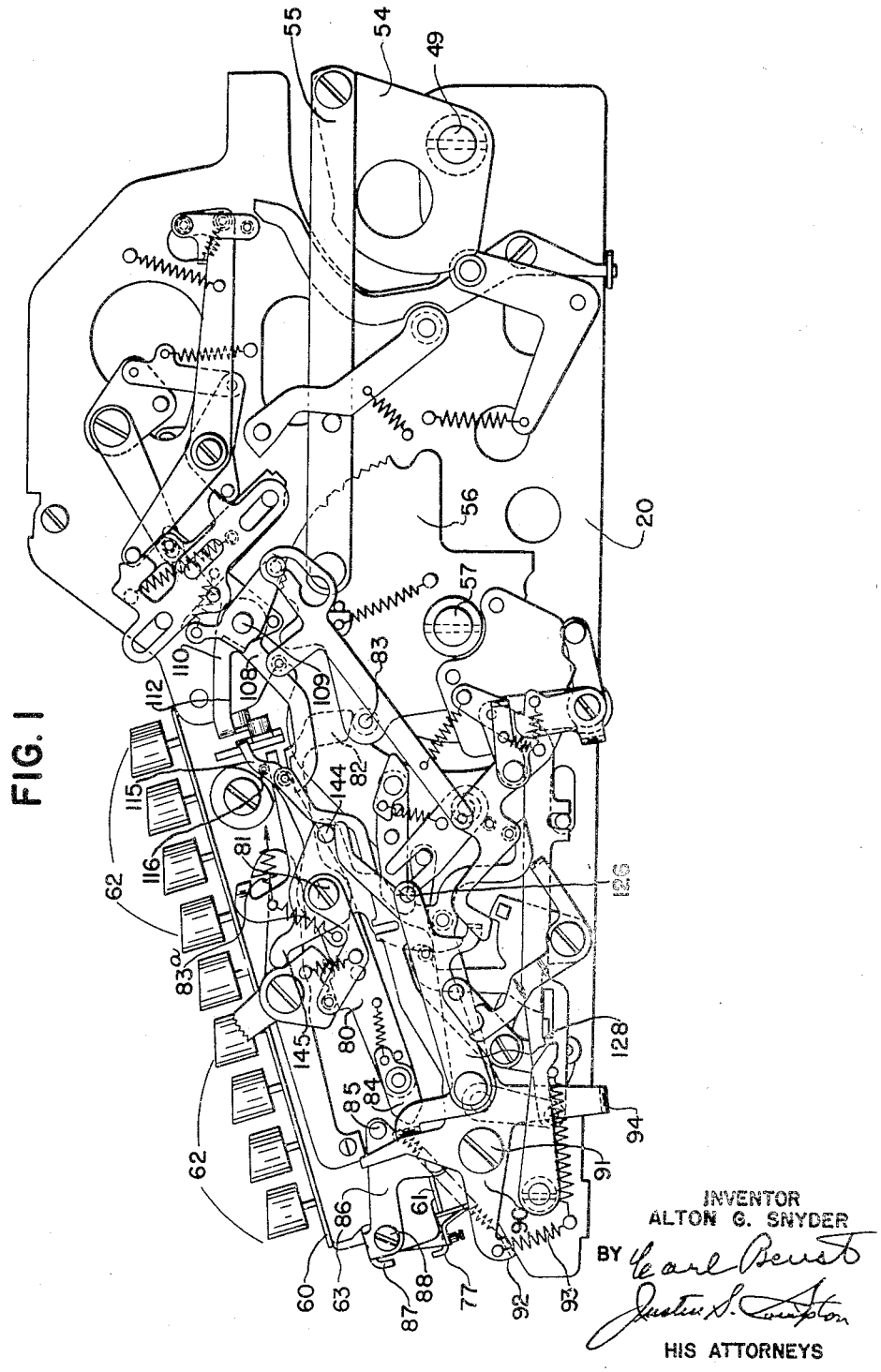
Fig. 1 is a right side elevation showing the machine control mechanism which is on the right side of the right vertical frame plate of the machine, this view showing the machine trip lever and a portion of the digit-key-latching means.

The machine framework includes a right vertical side frame plate 20 (Fig. 1), a left vertical side frame plate 21 (Fig. 2), and a machine base 22 (Fig. 3), all secured together in a rigid manner by various cross shafts and rods, which it is unnecessary to describe. The machine is driven by an electric motor 23 (Fig. 2), which, through reduction gearing, drives a shaft 24, on which is secured a notched wheel 25. Loosely mounted on shaft 24 is a crank plate 26 having pivoted thereto at 27 a pawl 28, urged to move counter-clockwise by a spring 29, so that a tooth thereon may engage the notched wheel 25 to couple the two together, so that, as the motor runs, the plate 26 will be turned in the direction of the arrow. When the machine is at rest, a stud 30 on the upwardly-extending arm of a three-armed lever 31, secured to a shaft 32, rests against the upper end of the pawl 28, holding it rocked clockwise against the urge of the spring 29, so that the tooth of the pawl 28 does not engage a notch in the notched wheel 25.

Figure 3:
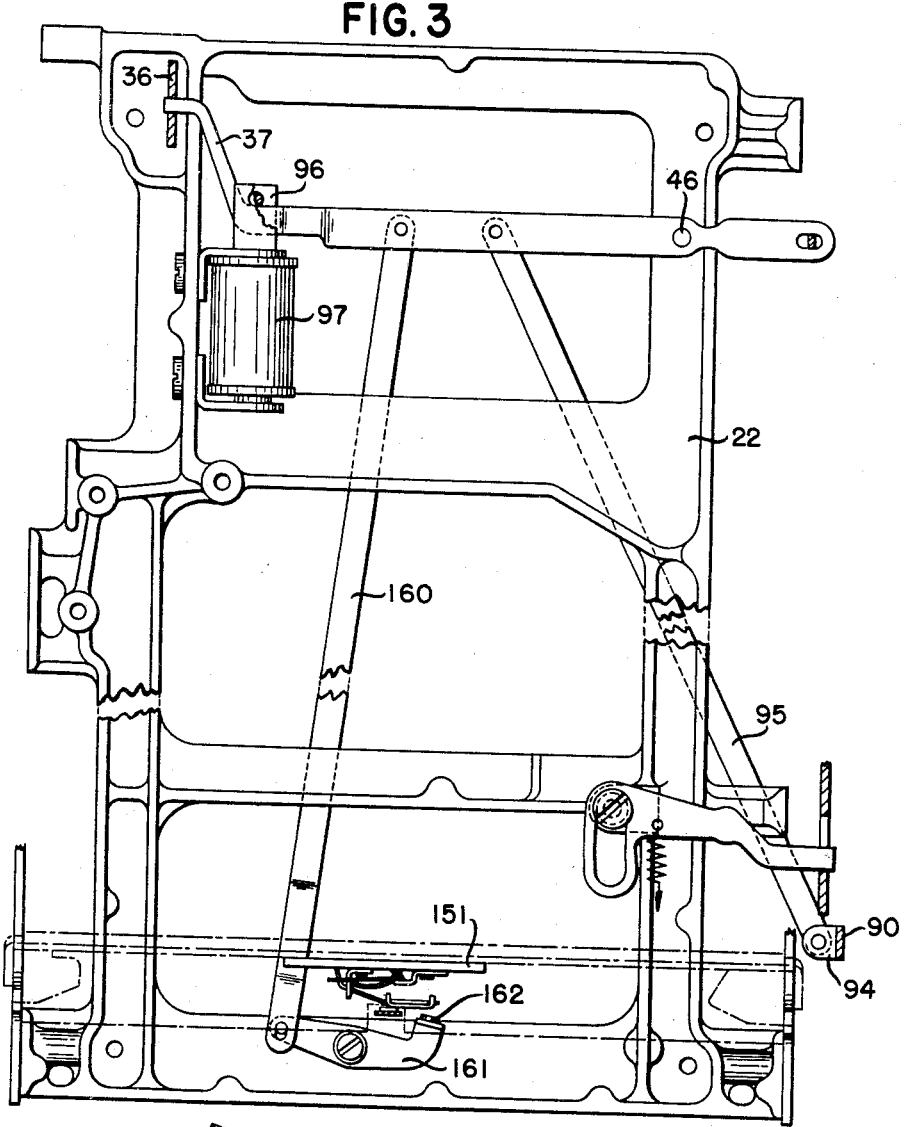
Fig. 3 is a top plan view of the machine base, showing the switch and solenoid means for tripping the machine to initiate a machine cycle through operation of a digit key to the machine-cycle-initiating point.
Figure 4:
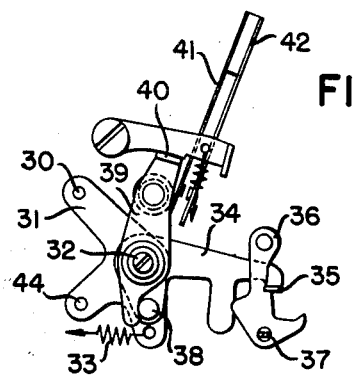
Fig. 4 is a detail view of the machine trip latch and motor switch mechanism which is located on the inside of the left vertical frame plate of the machine, the view being one looking toward the left of the machine.

Referring to Fig. 4, the right side of the three-armed lever 31 and its shaft 32 is seen. The three-armed lever 31 is constantly urged clockwise, as seen in Fig. 4, by a spring 33, extending between the downwardly-extending arm of the lever 31 and the machine frame plate 21 (Fig. 2). Also secured to the shaft 32 (Fig. 4) is a bell crank lever 34, having a bent-over ear 35 on its rearwardly-extending arm, which ear is engaged by a shoulder on a trip latch 36, effectively holding the three-armed lever 31 in its counter-clockwise position, as shown in Fig. 4, when the machine is at rest. When the machine is to go through a cycle of operation, the trip latch 36 is rocked clockwise, as seen in Fig. 4, through the movement of the end of a lever 37, which extends through a hole in said trip latch (see also Fig. 3). As the trip latch is rocked clockwise, the bell crank lever 34 is freed, allowing the shaft 32 and the three-armed lever 31 to rock clockwise as seen in Fig. 4, and counter-clockwise as seen in Fig. 2, releasing the pawl 28 to engage the notched wheel 25. Referring again to Fig. 4, as the bell crank lever 34 rocks clockwise, a stud 38 thereon rocks a lever 39, loosely mounted on the shaft 32, in the same direction, and an upper ear 40 thereon bears against blade 41 of main motor switch 42, to close the contacts thereof to start the motor. As the crank plate 26 (Fig. 2) nears the end of a complete rotation, a cam arm 43 thereon strikes a stud 44 on the three-armed lever 31, knocking said lever clockwise as seen in Fig. 2 and counter-clockwise as seen in Fig. 4, allowing the latch 36 to regain control of the lever 34 under the influence of spring 93, attached to trip lever 90 (Fig. 1) to be described. The latch 36 (Fig. 4) is rocked counter-clockwise to latching position by the spring 93 (Fig. 1), which urges the trip lever 90 to home position, as will be described. Thus, unless the lever 37 (Fig. 3) is held rocked counter-clockwise on its pivot 46 while the three-armed lever 31 is being rocked clockwise, as seen in Fig. 2, the machine motor will be stopped by the opening of switch 42 as lever 39 is allowed to be moved by the action of the spring of blade 41, stud 38 having been moved to the right.

As three-armed lever 31 (Fig. 2) moves to the position shown, its stud 30 knocks the approaching pawl 28 clockwise, disengaging the plate 26 from the motor drive shaft 24.

It will be understood, then, that, if the lever 37 (Fig. 3) is moved momentarily counter-clockwise, as seen in Fig. 3, the machine will be tripped and the crank plate 26 will be driven one rotation, and, if the lever 37 is held rocked in counter-clockwise position, the machine will continue to cycle as long as the said lever is held rocked counter-clockwise.

Pivoted to the plate 26 is a drive link 47, which is pivoted at its other end to a two-armed lever 48, loosely mounted on a rear drive shaft 49. The lever 48 has a coupling with the shaft 49 through the medium of a link 50, pivoted to the forwardly-extending arm of the two-armed lever 48. The upwardly and rearwardly extending end of the lever 50 has thereon a roller 51 adapted to engage a notch in a disk 52 secured to the shaft 49, and is held in engagement with said notch by a strong spring 53. Therefore, as the crank plate 26 makes one rotation in the direction of the arrow, the shaft 49 is rocked clockwise and then counter-clockwise, as seen in Fig. 2, to perform one cycle of machine operation. The right end of the rear drive shaft 49 may be seen in Fig. 1, and to said right end of the shaft 49 is secured a plate 54, having pivoted thereto a drive link 55, which is in turn pivoted to a drive control plate 56, secured to a forward drive shaft 57. The foregoing main operating mechanism, through other means which it is not necessary to discuss here, but which is shown in the Fowler et al. application Serial No. 237,758, to which reference has been made, operates the differential and totalizer mechanisms through which data set up on the digit keys, to be described, is entered into and withdrawn from the machine.

*The key bank unit*

The key bank unit is formed of top plate 60 (Figs. 1, 2, 6, and 8), a bottom plate 61, a right side plate 63 (Figs. 1 and 6), and a left side plate 64 (Figs 2, 6 and 8).

Figure 2:
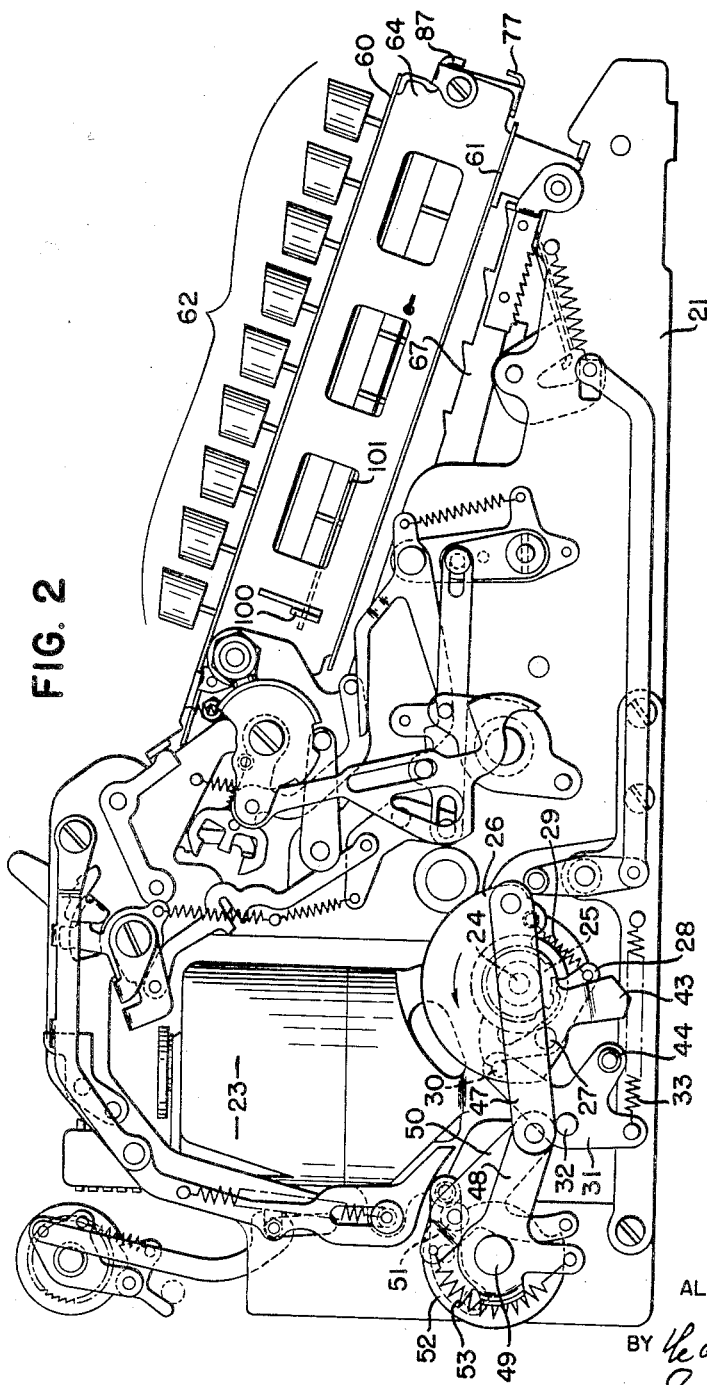
Fig. 2 shows the left side control means for causing cyclic operation of the machine, such being on the outside of the left vertical frame plate.

The digit keys 62 (Figs. 1, 2, 6, 7, and 8) are arranged in vertical rows, as seen in Figs. 1, 2, and 8, their stems being slidably mounted in alined slots in the top and bottom plates 60 and 61, in the usual manner.

Each key is urged to a restored condition—that is to say, in an upward direction—by its individual spring, such as spring 65, shown in Fig. 6, which is coiled around one leg of the key stem and which abuts on the bottom plate 61 of the key bank unit. Each of the keys may be depressed against the action of its spring, and, in such depressed condition as the keys are shown in Fig. 6, the lower ends 66 are in the path of differential stop bars, whereby, upon a cycle of machine operation, the stop bars are moved against them and located by them to represent the value of the depressed key, as is well known in the art and as fully explained in the aforementioned Fowler et al. application. One of these stop bars 67 is shown in Fig. 2. Upon the first half of machine cycle, the stop bars are permitted to move forward, and on the last half of machine cycle they are caused to move rearwardly, entering amounts set up on the digit keys into the totalizer, which will not be described.

The keyboard is of the "flexible" type, in which the depression of a key in a vertical column will cause restoration of any other depressed key in that column. To achieve this, there is on each key a formation 68 (Fig. 11), which cooperates with a shutter 69, which is common to all the keys of a key row. This shutter is pivoted to the key bank unit, as best shown in Fig. 6, where the typical shutter 69 is shown journaled to a cross member 59 of the key bank unit. These key latching shutters 69 are urged toward the key stems with which they are associated by a coil spring wound around the rod 70, by which they are pivoted and supported. In Fig. 11, the rightmost of the keys 62 is shown in the "up" position, where the formation 68 is above the shutter 69. The left key in Fig. 11 is shown in depressed position, with the formation 68 below the lower edge of the shutter 69, in which position it thereby is latched. The depression of the rightmost key would swing the shutter 69 on its pivots and release the leftmost key, if such were desired, thus constituting the "flexible" feature of the keyboard.

Associated with the right side of each column of keys is a shutter 71 (Fig. 6), held in contact with the right side of the key stem, as viewed from the front of the machine, with which it is associated, by a spring which is mounted on its rod 72, with which it is associated and by which it is supported. The shutters 71 are rocked when a key in the associated row is depressed to latched position, in which it will control the stop bar, the rocking removing a zero stop. As the zero stop mechanism is old and well known, and not particularly pertinent to an understanding of the invention, reference is made to United States Patent No. 2,062,731, which issued December 1, 1936, on the application of Charles Schroder, for a complete disclosure of such mechanism.

Common to the keys of a row is a slide 73 (Fig. 11), which passes through slots 74 in the key stems. The slide 73 has a notch therein for each key associated therewith, such as notch 76, shown in Fig. 8, each of said notches having a camming surface which cooperates with the top of the slot 74 with which it is associated, so that, if a key is depressed past the latching point, the top of its slot will come into contact with the cam surface 74 and move the slide 73 forward. There is an arm 75 (Fig. 11) depending from each of the slides 73. As shown in Fig. 9, the ends 75 of the slides 73 abut against a rockable bail 77 (see also Fig. 8), pivoted to and extending across the front of the key bank unit. The rocking of the bail 77, which may be accomplished by depression of any one of the digit keys past the latching point, sets the machine into operation by electro-mechanical means to be described later.

The key release mechanism

A key release lever 80 (Fig. 1), pivoted to the machine frame by a stud 81, has a rearwardly and downwardly projecting leg 82, which rests against a stud 83 on the plate 56, said lever 80 being held in such position by a spring 83a, extending between an upwardly extending arm of the lever 80 and the side plate 63 of the keyboard unit. As the machine operation commences, plate 56 rocks counter-clockwise, as seen in Fig. 1, allowing lever 80 to move in response to the urge of spring 83a, said lever consequently rocking clockwise. At the forward end of lever 80 is a by-pass pawl 84, which is so arranged as to by-pass a stud 85 on clockwise movement of lever 80 and to strike stud 85 solidly as the plate 56 moves clockwise to home position in the last half of the machine cycle. Stud 85 is on the rearwardly extending arm 86 of key release bail 87, which is pivoted to the right side plate 63 and the left side plate 64 of the key bank unit. As stud 85 is struck solidly, it moves bail 87 clockwise as seen in Fig. 1. The bail 87 extends across the front of the keys and has fingers which extend in between the shutters of each key row. These fingers, when bail 87 is rocked about its pivot 88 in a clockwise direction as by-pass pawl 84 strikes stud 85, push down between the shutters, releasing the keys; that is to say, the keys are allowed to restore to their normal position under the urge of their springs 65 (see Fig. 6). For a more detailed explanation of this whole construction, reference is again made to the Schroder patent before mentioned.

The machine trip mechanism

Referring to Fig. 1, trip lever 90 is pivoted to the right side frame plate 20 on stud 91 and is held resiliently in home position with an ear 92, on a forwardly extending arm of said lever, in contact with the edge of plate 20 by spring 93. A lower extending arm of lever 90 has an ear 94 (see also Fig. 3) having pivoted thereto a link 95 pivoted in turn to lever 37, before described. It will be seen from Figs. 1 and 3 that the clockwise rocking of lever 90, as seen in Fig. 1, will rock the lever 37 in a tripping direction against the action of spring 93, initiating a cycle of machine operation. It is important to an understanding of this invention that it be realized that movement of lever 37 in a tripping direction may be caused by solenoid 97 (Fig. 3), to be described, and that this will result in the forward movement of link 95, which, in turn, rocks lever 90 (Fig. 1) clockwise. As will be explained later, core 96 (Fig. 3) is moved forward by the electro-mechanical means when operated by the digit keys. Thus, whenever the machine is cycling, the trip lever 90 is cocked in its clockwise position.

The key locking mechanism

It is a vital part of this invention to supply a means for locking the keys either in restored position or in operated position while the machine is in operation, so that the keys may not be manipulated at that time. This is in addition to the regular latch-down means before described, and, when this locking means is effective, the keys may not be manipulated by the operator, either intentionally or unintentionally.

Slidably mounted in slots in the left and right side plates 63 and 64 of the key bank unit is a lock slide 100 (Figs. 5, 6, and 7). This slide normally is kept in the leftmost position, as shown in Fig. 7, it being understood that Figs. 5, 6, and 7 are rear views, by a wire spring 101, which may also be seen in Fig. 2, where its forward end is anchored in side plate 64 of the key bank unit. Associated with each denominational order of digit keys is a locking shutter 102 (Fig. 6), as is shown with relation to the middle row of keys in Fig. 6. Referring to Fig. 8, such locking shutters are mounted by ears 103 and 104 extending through holes in the bottom plate 61 of the key bank unit, with a loose fit, so that the top may wobble toward and away from the stems of the keys with which such shutters are associated.

Referring to Fig. 7, each key has a locking formation 103a, which cooperates with the bent-over top 104a of its associated shutter 102, so that, when the shutter is moved with its top to the position shown in Fig. 7, the keys may be depressed, and, when the shutters are in the position shown in Fig. 6, the bent-over portions 104a are either above or below the locking formations 103a, depending on whether the key in question is depressed or not. In Fig. 6 the three keys are shown in depressed condition and the locking slide 100 moved to the right in the direction of the arrow to lock the depressed keys in place.

Referring to Fig. 5, each of the shutters 102 has near its rear end an upwardly extending portion 105, which engages a corresponding notch 106 in the slide 100. By moving the slide back and forth, the whole series of shutters 102 are moved with it, the movement of the slide toward the left-hand side of the machine unlocking the keys, and the movement of the slide toward the right locking the keys.

As has been said, the normal position of the slide is to the left, in which condition the keys are unlocked. However, on the tripping movement of lever 90 (see Figs. 1 and 6), a stud 107 on a rearwardly and upwardly extending arm thereof bears down and moves counter-clockwise a two-armed lever 108, pivoted on stud 109 attached to the right side frame 20. An upwardly and forwardly extending arm 110 of lever 108 has a leftwardly and downwardly bent portion 111 having a roller 112, which rides against the right frame plate 63, as seen in Fig. 5. A cam surface 113 on portion 111 of lever 108 is in contact with a roller stud 114 mounted on slide 100. As the lever 108 is rocked upon the rocking of lever 90, the cam surface 113 pushes slide 100 to the right with regard to the front of the machine or to the left as seen in Fig. 5, locking the keys in either operated or unoperated position, as the case may be. As long as trip lever 90 is in operated condition—that is to say, while the machine is operating—the slide 100 is kept in locking position, shown in Fig. 6, to prevent the operation of or the release of the keys.

The trip lever 90 will have a slight restoring movement toward the end of a cycle of operation initiated by the digit keys because the solenoid is deenergized as the machine is tripped. To hold slide 100 from releasing operated keys before the solenoid is reenergized at the close of a machine cycle, a lever 115 (Fig. 1) has been provided to latch slide 100 in effective position until the very end of the machine cycle. This lever, pivoted on stud 81, has a stud 116, which rests on the top edge of the rear portion of key release lever 80. As the key release lever rocks clockwise, the rear end of lever 115 (Fig. 1) drops in notch 117 (Fig. 5) of slide 100, holding it from returning to home position under the action of spring 101. Lever 115 is lifted out of notch 117 at the very end of the machine cycle, but at that time the solenoid has been reenergized, as will be explained, which moves lever 90, causing cam edge 113 to hold slide 100 in effective position.

Repeat operation by use of add motor bar

Figure 12:
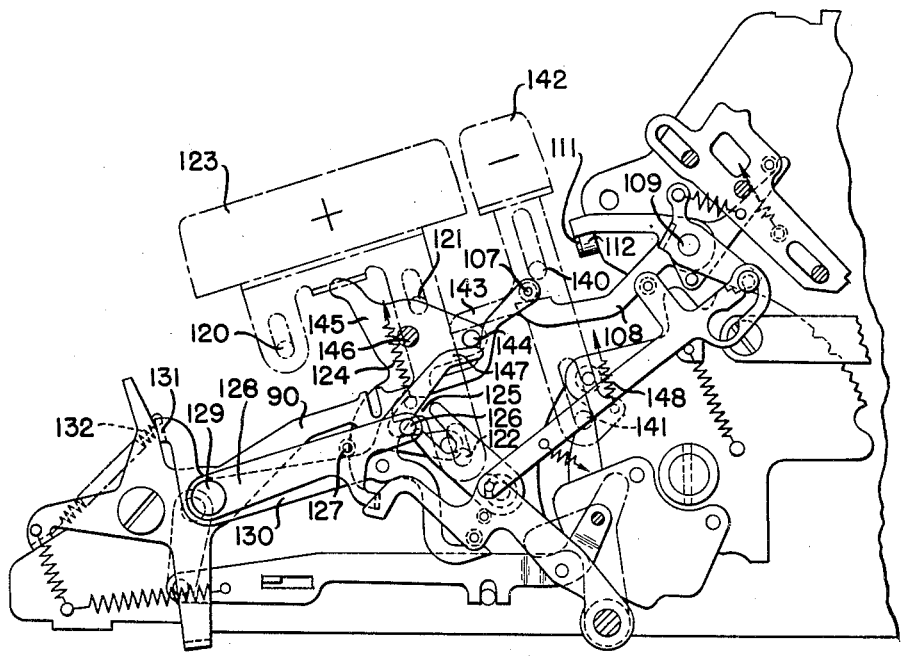
Fig. 12 is a detail view showing the trip mechanism on the right side of the machine and its relation to the motor bars.

Slidably mounted on studs 120, 121, and 122, secured to the inner wall of the machine cabinet, not shown, is an add motor bar 123, held in the position shown in Fig. 12 by a spring 124. A foot 125 on a leg of the motor bar 123 rests on a stud 126 on a lever 128, pivotally mounted at 129 to trip lever 90. A stud 127 on lever 128 abuts against the upper edge of lever 130, also mounted pivotally at 129 to lever 90. Lever 130 has an ear 131 held against an upper extending arm of lever 90 by spring 132. Thus, when motor bar 123 is depressed against the return action of spring 124, the lever 130 and the lever 90 are rocked clockwise, thus tripping the machine.

If motor bar 123 is held depressed, the trip lever 90 will also be held rocked, and the machine will keep performing cycles of operation. Because of the action of stud 107 on lever 108, the keys will be locked down, and the amount represented by them will be repeatedly entered into the totalizer. After the selected number has been repeatedly entered into the machine as many times as desired, the operator merely releases the motor bar 123, which is restored to the position shown in Fig. 12, which permits the relatching of the tripping mechanism.

*Repeat operation under control of subtract motor key*

Slidably mounted on studs 140 and 141, secured to the inside of the cabinet, not shown, is a subtract key 142, having a foot 143, which rests on the top of a stud 144 secured to subtract control plate 145, pivotally mounted at 146 to the right side plate 63 of the key bank unit. Stud 144 rests on the upwardly and rearwardly extending arm 147 of lever 130. If subtract motor key 142 is depressed against the urge of its restoring spring 148, it rocks plate 145 clockwise, which in turn will rock lever 90 to trip the machine, through lever 130 and spring 132, as described in connection with the add motor bar. Thus, holding down on the subtract motor key results in repeat operations with the digit keys held down. As shown in the Fowler et al. application to which reference has been made, the subtract control plate, by its clockwise movement, conditions the machine to subtract instead of to add. As a complete explanation of the subtract mechanism is not necessary to an understanding of the invention, it will not be described further, but reference is made to said Fowler et al. application for a detailed description thereof.

*Repeat control from digit keys*

Referring to Figs. 8, 9, 10, and 11, as has been explained, the downwardly extending forward ends 75 of slides 73 abut against a bail 77, pivotally mounted in the side plates of the key bank unit. Downwardly extending from the middle portion of the bail is an arm 150, normally held in contact with a toggle action switch 151 by a spring 152. The pressure of arm 150 against the toggle switch, as is normal in rest position, keeps said toggle switch open, opening the circuit from supply terminals 153 and 154 to the solenoid 97, as shown in Fig. 10. A switch 155 is provided to disable the solenoid if the motorized digit key mechanism is to be rendered inoperable. In using the digit keys to set the machine into operation and to control repeat entries of data, the switch 155 is first closed, and a selected amount is set up on the digit keys. The last digit key to be operated, or any of the keys that have been set to control position, may then be depressed against the added resistance to rock the bail 77. This causes the bail to swing clockwise, as seen in Fig. 8, moving arm 150 away from switch 151, which immediately closes, operating the solenoid 97 and rocking the lever 37, to which it is coupled by a pin 156.

Referring to Fig. 3, as before said, the rocking of lever 37 and the tripping action move forward the link 95, which rocks the trip lever 90 to tripped position, which in turn locks the keys by the operation of slide 100 (Fig. 6) and lever 115 (Fig. 1). It follows, then, that the holding down of any of the digit keys to the position beyond the control position will start the machine cycling, and the keys will be locked in operated or unoperated position, as the case may be. Because the solenoid is deenergized after the start of a machine cycle to allow the trip latch to move to latching position if the digit key is released by the operator, lever 115 is provided to hold slide 100 in locking position during a machine cycle.

Pivoted to lever 37 (Fig. 3) is a link 160 pivoted at its forward end to a lever 161 pivoted to the machine base 22. As the solenoid 97 moves lever 37, link 160 moves forward, rocking lever 161 counter-clockwise, whereupon a pad 162 strikes the toggle switch 151 to open it, disabling the solenoid circuit during machine operations. However, as a machine cycle closes, lever 37 starts to move toward latching position under the influence of the spring 93 (Fig. 1). Partial movement of lever 161 toward home position, shown, causes reenergization of the solenoid if a digit key is held depressed in cycle-initiating position.

While the form of mechanism shown and described herein is admirably adapted to fulfill the objects primarily stated, it is to be understood that it is not intended to confine the invention to the one form or embodiment disclosed herein, for it is susceptible of embodiment in various other forms.

What is claimed is:

In a calculating machine, the combination of a main operating means; drive means for cyclically driving the main operating means; trip means operable to cause the drive means to drive the main operating means through one or more cycles of operation; digit keys selectively operable from a home position to a position where they control the entry of data during a machine cycle, and each being operable further to operate the trip means; key latch means to hold the keys in said first position; key locking means operable to an effective position to lock the keys in operated condition or in unoperated condition as the case may be; means operative in each machine cycle to operate the key latch means to release the keys from said first position; and means connecting the trip means and the key locking means so that, as the trip means is operated, the key locking means is operated to an effective position and held there until the end of the one or more cycles of machine operation caused by the further operation of any one of the digit keys, whereby all the operated digit keys, whether operated to control position or further are prevented from returning to home position until the end of the last cycle of operation.

References Cited in the file of this patent
UNITED STATES PATENTS

| | | |
|---|---|---|
| 1,384,632 | Phinney | July 12, 1921 |
| 1,619,796 | Shipley | Mar. 1, 1927 |
| 1,874,365 | Sburlino | Aug. 30, 1932 |
| 2,143,741 | Pott | Jan. 10, 1939 |
| 2,330,689 | Crosman | Sept. 28, 1943 |
| 2,552,789 | Hopkins | May 15, 1951 |
| 2,654,539 | Brubaker et al. | Oct. 6, 1953 |
| 2,745,601 | Fowler | May 15, 1956 |